United States Patent
Qi et al.

(10) Patent No.: US 12,302,946 B2
(45) Date of Patent: May 20, 2025

(54) HEAT INSULATION MECHANISM SUITABLE FOR ELECTROMAGNETIC INDUCTION-TYPE AEROSOL GENERATION DEVICE AND AEROSOL GENERATION DEVICE

(71) Applicant: SHENZHEN FIRST UNION TECHNOLOGY CO., LTD., Shenzhen Guangdong Province (CN)

(72) Inventors: Zuqiang Qi, Shenzhen Guangdong Province (CN); Baoling Lei, Shenzhen Guangdong Province (CN); Jiamao Luo, Shenzhen Guangdong Province (CN); Zhongli Xu, Shenzhen Guangdong Province (CN); Yonghai Li, Shenzhen Guangdong Province (CN)

(73) Assignee: SHENZHEN FIRST UNION TECHNOLOGY CO., LTD., Shenzhen Guangdong Province (CN)

(*) Notice: Subject to any disclaimer, the term of this patent is extended or adjusted under 35 U.S.C. 154(b) by 364 days.

(21) Appl. No.: 17/757,012

(22) PCT Filed: Dec. 9, 2020

(86) PCT No.: PCT/CN2020/134980
§ 371 (c)(1),
(2) Date: Jun. 8, 2022

(87) PCT Pub. No.: WO2021/115337
PCT Pub. Date: Jun. 17, 2021

(65) Prior Publication Data
US 2023/0012249 A1 Jan. 12, 2023

(30) Foreign Application Priority Data
Dec. 9, 2019 (CN) .......................... 201922182061.5

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *F16L 59/065* (2013.01); *H05B 6/105* (2013.01)

(58) Field of Classification Search
CPC ........ H05B 6/105; F16L 59/065; A24F 40/20; A24F 40/465; A24F 40/42; A24F 40/30; A24F 40/10
See application file for complete search history.

(56) References Cited

U.S. PATENT DOCUMENTS

2007/0283972 A1* 12/2007 Monsees .............. A61M 11/048
131/273
2021/0378304 A1* 12/2021 Bogran ................... A24F 40/42

FOREIGN PATENT DOCUMENTS

| CN | 201280030681 A | 5/2014 |
| CN | 105307526 A | 2/2016 |

(Continued)

*Primary Examiner* — Alex B Efta
(74) *Attorney, Agent, or Firm* — Proi Intellectual Property US (57) ABSTRACT

A heat insulation mechanism suitable for an electromagnetic induction-type aerosol generation device and an aerosol generation device are provided. The aerosol generation device comprises a magnetic field generator and a susceptor that are inductively coupled; a heat insulator configured to reduce conduction of heat from the susceptor to the outside, the heat insulator comprising a tube wall, and a central region defined by the tube wall, the tube wall containing a metal or an alloy, and the pressure in the central region being configured to be lower than the pressure outside the heat insulator; and a magnetic field shield, configured to isolate the heat insulator from a varying magnetic field, so as to (Continued)

prevent the heat insulator from being penetrated by the varying magnetic field to generate heat. The aerosol generation device can shield the vacuum heat insulator from the magnetic field as far as possible.

18 Claims, 4 Drawing Sheets

(51) Int. Cl.
*F16L 59/065* (2006.01)
*H05B 6/10* (2006.01)

(56) References Cited

FOREIGN PATENT DOCUMENTS

| | | | |
|---|---|---|---|
| CN | 105342014 | A | 2/2016 |
| CN | 206137197 | U | 5/2017 |
| CN | 108433191 | A | 8/2018 |
| CN | 109330030 | A | 2/2019 |
| EP | 3506721 | A1 | 7/2019 |
| WO | 2013131764 | A1 | 9/2013 |
| WO | 20190053268 | A1 | 3/2019 |
| WO | WO2019053268 | A1 | 3/2019 |

* cited by examiner

HEAT INSULATION MECHANISM SUITABLE FOR ELECTROMAGNETIC INDUCTION-TYPE AEROSOL GENERATION DEVICE AND AEROSOL GENERATION DEVICE

TECHNICAL FIELD

The embodiment of the present disclosure relates to the technical field of heat insulation of heating and nonburning smoking sets, and in particular to a heat insulation mechanism for an aerosol generation device and an aerosol generation device.

BACKGROUND

Tobacco products (e.g., cigarettes, cigars, etc.) are burning tobaccos to produce tobacco smoke during use. People attempt to make products that release compounds without burning so as to replace these tobacco products burning tobaccos.

An example of this kind of products is a heating device, which heats rather than burns a material to release compounds, for example, the material may be a tobacco product or other non-tobacco products which may contain or not contain nicotine. As an example of a known heating device, generally, the device includes a heat insulation component, which is configured to prevent conduction or diffusion of heat towards the surface of the device during the heating process to result in security problems such as scalding; therefore, the patent No. 201280030681.5 discloses a heat insulation equipment for heating a smokable material, which insulates the heating device using a heat isolation tube having a vacuum central region; moreover, in order to enable the heat insulation equipment to have a strength to withstand vacuumizing under a low thickness, generally the heat insulation equipment is made of metal materials having a proper strength.

However, the inventor finds during the process of implementing this application the following problem. At present, another example of the known heating device includes an electromagnetic induction-type heating component; when the above metallic vacuum heat insulation equipment is applied to the electromagnetic induction-type heating device, the metallic vacuum heat insulation equipment itself will generate heat under the induction of the magnetic field and thus impacts heat insulation effect.

SUMMARY

The embodiment of the present disclosure aims to provide a heat insulation mechanism for an aerosol generation device and an aerosol generation device, which can solve the problem of poor heat insulation effect of the vacuum heat insulation equipment.

In order to solve the above technical problem, an embodiment of the present disclosure employs a technical scheme as follows. An aerosol generation device is provided, which is configured to heat a smokable material to generate an aerosol, including: a chamber, which is configured to receive a smokable material; a magnetic field generator, which is configured to generate a varying magnetic field; a susceptor, which is configured to be penetrated by the varying magnetic field to generate heat, so as to heat the smokable material received in the chamber; a heat insulator, which is configured to reduce conduction of heat from the susceptor towards the periphery along a radial direction of the chamber, the heat insulator including a tube wall, and a central region defined by the tube wall, wherein the tube wall contains a metal or an alloy, and the pressure inside the central region is configured to be lower than the pressure outside the heat insulator; and a magnetic field shield, which is configured to isolate the heat insulator from the varying magnetic field, so as to prevent the heat insulator from being penetrated by the varying magnetic field to generate heat.

Optionally, the magnetic field shield forms a magnetic field isolation region isolated from the varying magnetic field, and the heat insulator is arranged within the magnetic field isolation region so as to be isolated from the varying magnetic field.

Optionally, the magnetic field isolation region is a roughly closed space enclosed and formed by the magnetic field shield.

Optionally, the heat insulator presents a tubular shape extending along a length direction of the chamber, and a tubular hollow of the heat insulator forms an accommodation space configured to accommodate and hold the magnetic field generator and the susceptor; and the magnetic field shield at least includes an electromagnetic shielding film extending along an axial direction of the heat insulator that encloses and forms the accommodation space.

Optionally, the heat insulator includes an inner tube wall and an outer tube wall that are arranged in turn from inside to outside along the radial direction, and the central region formed between the inner tube wall and the outer tube wall; and the electromagnetic shielding film is bonded onto an inner surface of the inner tube wall.

Optionally, the electromagnetic shielding film is flexible.

Optionally, the magnetic field shield further includes a rigid support body, and the electromagnetic shielding film is bonded onto the inner surface of the inner tube wall under the support or holding of the rigid support body.

Optionally, the rigid support body presents a tubular shape extending along the axial direction of the heat insulator.

Optionally, the magnetic field shield includes a first electromagnetic shielding film and a second electromagnetic shielding film that are arranged in turn from inside to outside along the radial direction of the chamber; and certain space is reserved between the first electromagnetic shielding film and the second electromagnetic shielding film, thereby forming the magnetic field isolation region.

Optionally, the electromagnetic shielding film has a thickness from 0.06 to 1.0 mm.

Optionally, the electromagnetic shielding film is formed by one or more materials having a frequency of 20~300 kHz and a relative magnetic conductivity of 80~660.

In order to solve the above technical problem, an embodiment of the present disclosure employs another technical scheme as follows. A heat insulation mechanism for an aerosol generation device is provided, the aerosol generation device including a magnetic field generator configured to generate a varying magnetic field, and a susceptor configured to be penetrated by the varying magnetic field to generate heat, wherein the heat insulation mechanism includes: an accommodation space, which is configured to accommodate the magnetic field generator and the susceptor; a heat insulator, which is configured to reduce conduction of heat from the susceptor towards the periphery along a radial direction of the accommodation space, the heat insulator including a tube wall, and a central region defined by the tube wall, wherein the tube wall contains a metal or an alloy, and the pressure inside the central region is configured to be lower than the pressure outside the heat insulator; and a magnetic field shield, which is connected to the heat insulator and is configured to isolate the heat insulator from the varying magnetic field, so as to prevent the heat insulator from being penetrated by the varying magnetic field to generate heat.

Optionally, the heat insulator includes an inner tube wall and an outer tube wall that are arranged in turn from inside to outside along the radial direction of the accommodation space, and the central region formed between the inner tube wall and the outer tube wall; the magnetic field shield at least includes a first electromagnetic shielding film bonded onto an inner surface of the inner tube wall; or, the magnetic field shield at least includes a first electromagnetic shielding film bonded onto an inner surface of the inner tube wall, and a second electromagnetic shielding film bonded onto an outer surface.

The embodiment of the present disclosure has the following benefits. A heat insulation mechanism for an aerosol generation device and an aerosol generation device are provided, which can shield the vacuum heat insulation tube from the magnetic field as much as possible, thereby preventing a vacuum heat insulation tube itself made of metal or alloy materials such as stainless steel, nickel steel, chromium steel or tungsten steel from heating under the induction of the magnetic field, and maintaining a good heat insulation effect.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form proportional restrictions unless otherwise stated.

DETAILED DESCRIPTION

To make the purpose, the technical scheme and the advantages of the embodiments of the present disclosure more apparent and understandable, a clear and complete description is provided below to the technical scheme in the embodiments of the present disclosure in conjunction with the drawings in the embodiments of the present disclosure. Obviously, the embodiments described hereinafter are simply part embodiments of the present disclosure, but all the embodiments. It should be understood that the exemplary embodiments described below are merely to illustrate, but to limit, the present disclosure. All other embodiments obtained by the ordinary staff in the field based on the embodiments in the present disclosure without creative work are intended to be included in the scope of protection of the present disclosure.

It is to be noted that when an element is described as "fixed to" another element, it may be directly on the another element, or there might be one or more intermediate elements between them. When one element is described as "connected to" another element, it may be directly connected to the another element, or there might be one or more intermediate elements between them. Terms "vertical", "horizontal", "left", "right," and similar expressions used in this description are merely for illustration.

In addition, technical features involved in each embodiment of the present disclosure described below can be combined mutually if no conflict is incurred.

One embodiment of the present disclosure provides an aerosol generation device which heats through electromagnetic induction a smokable material, such as cigarette, so that at least one of the volatile ingredients vaporizes to generate an aerosol for inhalation.

Figure 1:
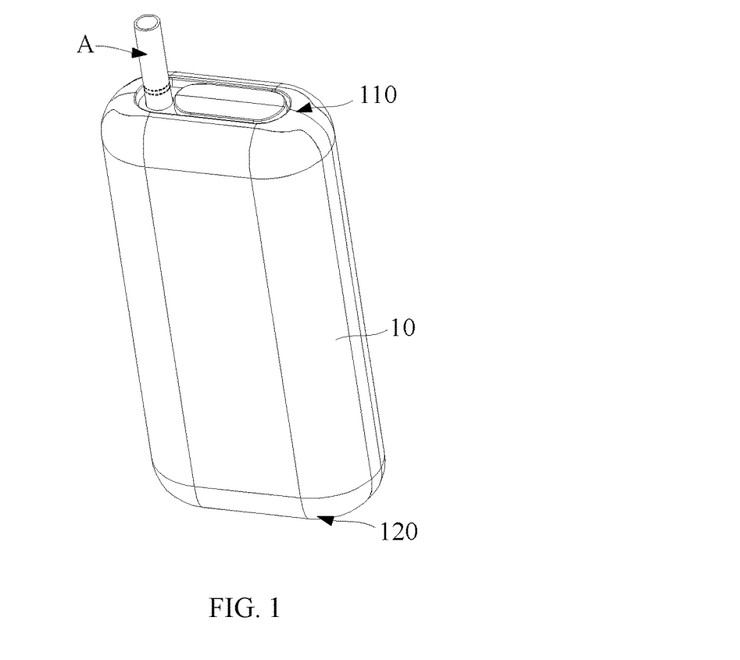
FIG. 1 is a structure diagram of an aerosol generation device according to one embodiment.
Figure 2:
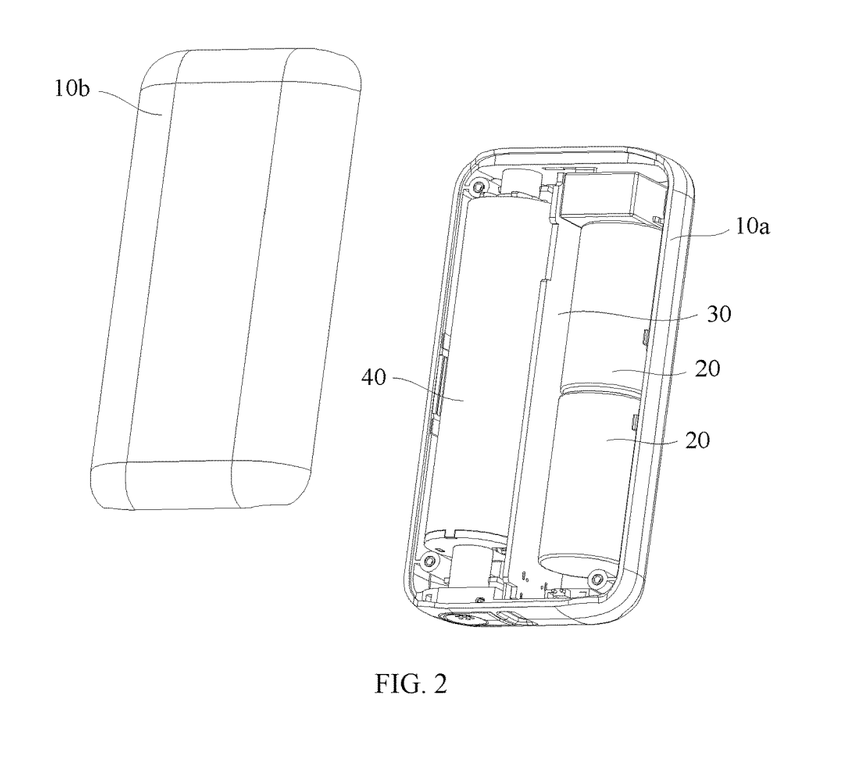
FIG. 2 is an exploded view of the aerosol generation device shown in FIG. 1.

In one embodiment, based on function requirements, the aerosol generation device may refer to FIG. 1 to FIG. 2 in structure and function, including:

a housing body 10, which is roughly square in overall shape, that is, the size along the length direction is greater than the size along the width direction, and the size along the width direction is greater than the size along the thickness direction, wherein the housing body 10 includes a proximal end 110 and a distal end 120 that are opposite along the length direction; during usage, the proximal end 110 is used as an end portion approaching the user to inhale and operate the smokable material A.

Through a hole or opening defined on the proximal end 110, the smokable material A is at least partially received into the housing body 10 along the length direction, as shown in FIG. 1, or the smokable material A is removed from the housing body 10.

Further, in order to make the function of the aerosol generation device completely implemented, the detailed content and structure of the aerosol generation device may refer to FIG. 2.

The housing body 10 includes a lower housing body 10a and an upper housing body 10b that can be detached from each other along the thickness direction; the lower housing body 10a and the upper housing body 10b are matched with each other to form an accommodation space which is located within the housing body 10 and is configured to install all necessary functional components.

As shown in FIG. 2, the housing body 10 is internally provided with a DC (Direct Current) battery cell 20 used to supply power and a circuit board 30, and a heating assembly 40 arranged along the length direction, wherein the heating assembly 40 is constructed as being capable of receiving at least part of the smokable material A and heating it during usage.

Figure 3:
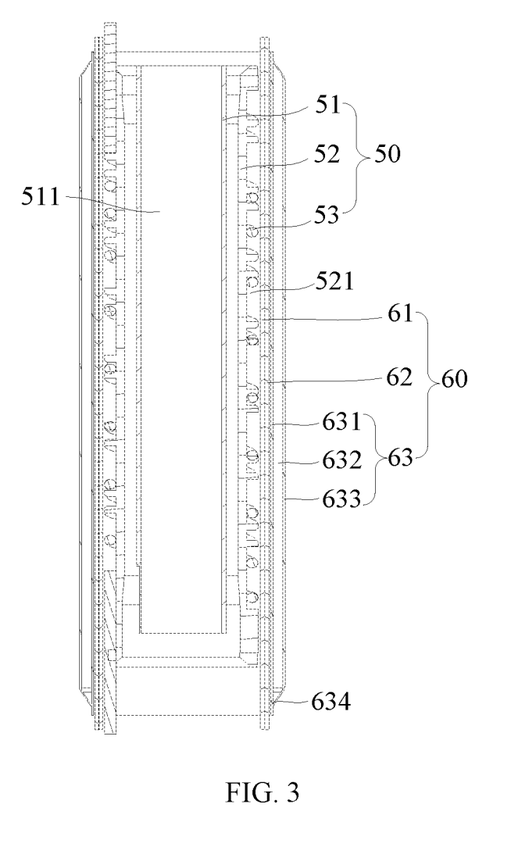
FIG. 3 is a sectional view of a heating assembly shown in FIG. 2.
Figure 4:
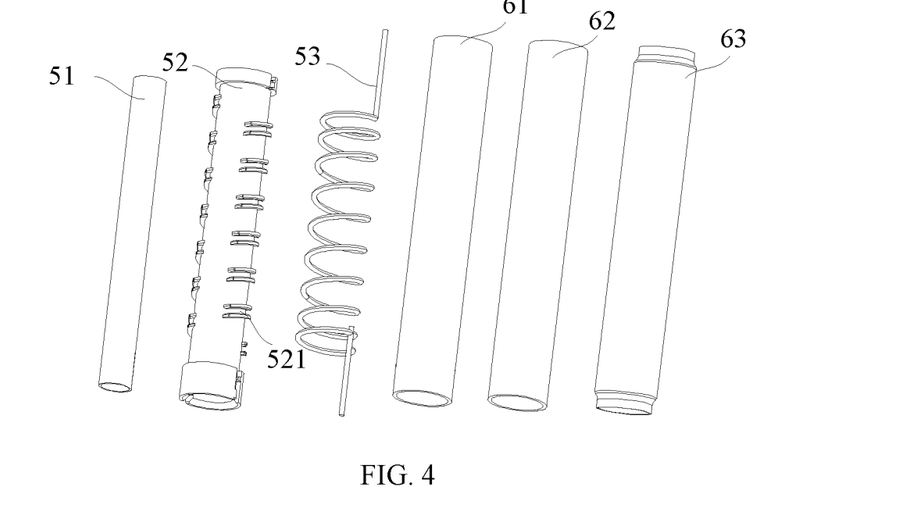
FIG. 4 is an exploded view of the heating assembly shown in FIG. 3.

Specifically, a sectional view of the heating assembly 40 is illustrated in preferred embodiments shown in FIG. 3 and FIG. 4, including an electromagnetic induction heating mechanism 50 and a heat insulation mechanism 60 that are arranged in turn from inside to outside along the radial direction, wherein the electromagnetic induction heating mechanism 5 includes a tubular susceptor 51, a tubular holder 52 and an induction coil 53 that are arranged in turn from inside to outside.

An inner space of the tubular susceptor 51 forms a chamber 511 configured for receiving at least part of the smokable material A; the tubular susceptor 51 is made of metal or alloy materials having an appropriate magnetic conductivity, for example, Grade 420 stainless steel (SS420) and an alloy material containing iron and nickel (for example, permalloy); during usage, the tubular susceptor 51 is inductively coupled with the induction coil 53, so as to be penetrated by a varying magnetic field to generate heat under the induction of the induction coil 53, thereby heating at least part of the smokable material A inside the chamber 511 to generate an aerosol for inhalation.

The induction coil 53 is configured to generate, under supply of alternating current, an alternating magnetic field that can penetrate through the tubular susceptor 51, thereby inducing the tubular susceptor 51 to generate heat; further, to facilitate the stable coupling between the induction coil 53 and the tubular susceptor 51, during implementation the induction coil 53 is fixed by being wound around an external surface of the tubular holder 52. According to preferred embodiments shown in FIG. 3 and FIG. 4, the external surface of the tubular holder 52 defines a line groove 521 adapted to the induction coil 53 in shape, and the induction coil 53 is stably held on the tubular holder 52 through the line groove 521.

The heat insulation mechanism 60 includes a support tube 61, an electromagnetic shielding film 62 and a vacuum heat insulation tube 63 that are arranged in turn from inside to outside, wherein as shown in FIG. 3, the vacuum heat insulation tube 63 includes an inner tube wall 631, an outer tube wall 633, and a central region 632 located between the inner tube wall 631 and the outer tube wall 633, wherein the pressure inside the central region 632 is configured to be lower than the pressure outside the vacuum heat insulation tube 63, that is, there is certain vacuum, thereby reducing radiation and diffusion of heat from the electromagnetic induction heating mechanism 50, mainly the tubular susceptor 51, towards outside along the radial direction.

During implementation, the inner tube wall 631 and the outer tube wall 633 may be made of stainless steel, high-strength metals such as tungsten steel, or PEEK (Polyether ether ketone), glass, ceramic, polyimide and so on. Based on general product implementation, in order to ensure that the tube wall with a low thickness, such as 0.1 to 0.3 mm, will have a proper strength after the vacuum heat insulation tube 63 is vacuumized, during implementation the inner tube wall 631 and the outer tube wall 633 are made of a metal or alloy, for example, stainless steel, nickel steel, chromium steel or tungsten steel and the like.

Further, in a preferred embodiment, the electromagnetic shielding film 62 is located between the vacuum heat insulation tube 63 and the induction coil 53, to distort or shield the magnetic field generated by the induction coil 53, thereby reducing the magnetic flux penetrating through the vacuum heat insulation tube 63 or shielding the vacuum heat insulation tube 63 from the magnetic field generated by the induction coil 53 as much as possible, and finally preventing the vacuum heat insulation tube 63 itself made of metal or alloy materials from heating under the induction of the magnetic field.

Generally, the electromagnetic shielding film 62 may be a thin film formed by mixing at least one of silver coated copper powder, silver coated nickel powder, copper powder, nickel powder or ferrite powder with a flexible resin material and then solidifying them. For example, GF1000/2000 and the like commercially available from the market; the effective operating frequency suitable for electromagnetic waves is ranged from 20 to 300 kHz, its relative magnetic conductivity is 80 to 660, and the thickness may be reduced to 0.06 to 1.0 mm.

In a more preferred embodiment, the electromagnetic shielding film 62 is made of a microwave absorbing material, preferably a flexible soft magnetic material formed by mixing a flexible soft magnetic adhesive, a resin and a rare metal polymer in accordance with a certain proportion. Since it can easily conduct impedance match at the frequency band of electromagnetic induction heating, it can achieve high magnetic convergence effect and has excellent microwave absorption performance, thereby being able to achieve isolation and absorb magnetic lines of force.

In a preferred embodiment, the electromagnetic shielding film 62 employs a type of materials having appropriate effective operating frequency and magnetic conductivity according to the operating frequency of the induction coil 53, so that it can absorb and shield over 95% of the magnetic lines of force generated by the induction coil 53 that can penetrate through the vacuum heat insulation tube 63.

Further, due to the fact that the electromagnetic shielding film 62 has a flexible property, which is uneasy to assemble and fix with the vacuum heat insulation tube 63 or the tubular holder 52, the heat insulation mechanism 60 further includes a support tube 61 which serves as a rigid substrate to provide support for the electromagnetic shielding film 62. During implementation, the support tube 61, serving as a substrate to fix the electromagnetic shielding film 62, may be attached with the electromagnetic shielding film 62 before being embedded into the vacuum heat insulation tube 63 to form the complete heat insulation mechanism 60; alternatively, the support tube 61 attached with the electromagnetic shielding film 62 may be sleeved outside the tubular holder 52 before being sleeved with the vacuum heat insulation tube 63.

In a more preferred embodiment, the support tube 6 is made of polyimide (PI), PEEK (Polyether ether ketone), ceramic and the like materials, with the thickness controlled at about 0.1 to 0.3 mm.

Figure 6:
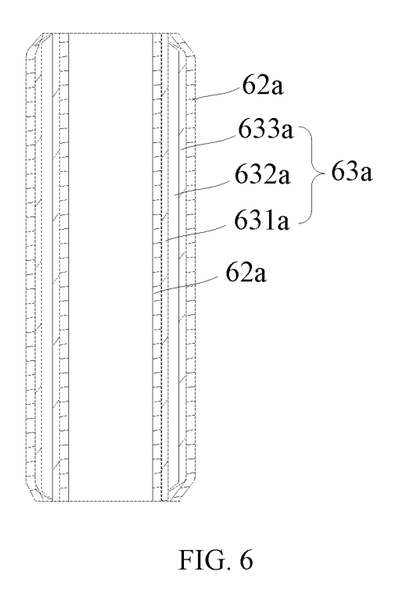
FIG. 6 is a structure diagram of a vacuum insulation mechanism according to another embodiment.

In other variant embodiments, the number of the electromagnetic shielding films 62 may be increased to two, three or more; for example, in the embodiment shown in FIG. 6, the number of the electromagnetic shielding films 62a is 2, which are arranged in turn towards outside along the radial direction and define certain space therebetween, so that a magnetic field shielded region or space is formed between the two electromagnetic shielding films 62, then the vacuum heat insulation tube 63a is arranged within the magnetic field shielded region or space. Of course, according to the effect of implementation, the magnetic field shielded region or space formed by two electromagnetic shielding films 62a is a closed spatial region, rather than an opening spatial region.

In an easy implementation of FIG. 6, the two electromagnetic shielding films 62a may be attached onto inner and outer surfaces of the vacuum heat insulation tube 63a respectively, so that the vacuum heat insulation tube 63a is located within the electromagnetic shielded space formed by the two electromagnetic shielding films 62a to become isolated.

Based on the fact that the inner tube wall 631 and the outer tube wall 633 of the vacuum heat insulation tube 63 are made of metal or alloy materials, and are welded at two end portions along the length direction to form a welding portion 634 so that the inner tube wall 631 and the outer tube wall 633 are integrated into one piece, thus, the welding portion 634 is easy to accumulate heat during usage. In one more preferred embodiment, the outer surface of the vacuum heat insulation tube 63 may be attached with an anisotropic material layer (not shown in figures). The anisotropic material has different physical properties in different directions of dimensions. During implementation, the anisotropic material layer is configured to have a lower thermal conductivity along the radial direction of the vacuum heat insulation tube 63 than along the axial direction, thus the accumulated heat of the welding portion 634 may be conducted to other positions of the outer tube wall 633 along the axial direction, thereby reducing the local high temperature of the welding portion 634.

The above anisotropic layer for heat conduction is made of one or more of graphite sheet or graphite powder, graphene coating, carbon fiber, titanium dioxide polycrystalline film, polycrystalline silicon and so on. Based on differential settings for heat conduction, the coefficient of heat conductivity of the anisotropic material layer along the axial direction is configured as 30 times that along the circumferential direction. Based on the selection of common materials and the effect of implementation, preferably, the coefficient of heat conductivity along the axial direction is configured as 30 to 100 times that along the circumferential direction.

Figure 5:
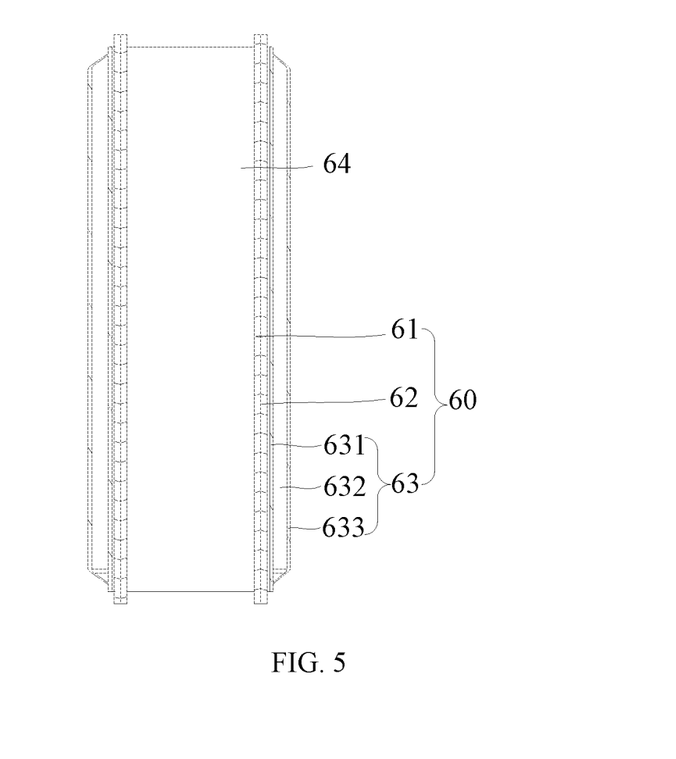
FIG. 5 is a structure diagram of a vacuum insulation mechanism according to one embodiment.

One embodiment of the present disclosure further provides a vacuum heat insulator for an electromagnetic heating-type aerosol generation device, whose structure can refer to FIG. 5 and presents a longitudinal tubular shape, including:

a PI support tube 61, an electromagnetic shielding film 62 and a vacuum heat insulation tube 63 that are arranged in turn from inside to outside along the radial direction, and an accommodation chamber 64 formed by a tubular hollow portion, wherein the tube wall of the vacuum heat insulation tube 63 is made of a metal or alloy with proper strength, such as stainless steel, nickel steel, chromium steel or tungsten steel.

The accommodation chamber 64 is configured to accommodate an electromagnetic induction-type heating mechanism, for example, a heating mechanism including the above induction coil 53 and susceptor 51; the vacuum heat insulation tube 63 is configured to reduce or prevent diffusion and conduction of heat from the electromagnetic induction-type heating mechanism within the accommodation chamber 64 towards outside; the electromagnetic shielding film 62 is configured to reduce the magnetic flux of the magnetic field generated by the electromagnetic induction-type heating mechanism penetrating through the stainless steel vacuum heat insulation tube 63 or shield the stainless steel vacuum heat insulation tube 63 from the magnetic field as much as possible.

The PI support tube 61, serving as a rigid support carrier, is configured to provide convenience and stability of installation for the electromagnetic shielding film 62.

The heat insulation mechanism can shield the vacuum heat insulation tube from the magnetic field as much as possible, thereby preventing a vacuum heat insulation tube itself made of metal or alloy materials such as stainless steel, nickel steel, chromium steel or tungsten steel from heating under the induction of the magnetic field, and maintaining a good heat insulation effect.

It is to be noted that the description of the present disclosure and the drawings just list preferred embodiments of the present disclosure. The present disclosure may, however, be exemplified in many different forms and should not be construed as being limited to the specific embodiments set forth herein. These embodiments are not intended to form extra limits to the content of the present disclosure, rather, they are provided so that this disclosure will be thorough and complete. Moreover, the above technical features may continue to combine with each other to form various embodiments not listed above, and these embodiments are all intended to be covered by the description of the present disclosure. Further, for the ordinary staff in this field, improvements or variations may be made according to the above description, and these improvements or variations are intended to be included within the scope of protection of the claims appended hereinafter.

What is claimed is:

1. An aerosol generation device, configured to heat a smokable material to generate an aerosol, comprising:
   a chamber, which is configured to receive a smokable material;
   a magnetic field generator, which is configured to generate a varying magnetic field;
   a susceptor, which is configured to be penetrated by the varying magnetic field to generate heat, so as to heat the smokable material received in the chamber;
   a heat insulator, which is configured to reduce conduction of heat from the susceptor towards a periphery along a radial direction of the chamber, the heat insulator comprising a tube wall, and a central region defined by the tube wall, wherein the tube wall contains a metal or an alloy; and
   a magnetic field shield, which is configured to isolate the heat insulator from the varying magnetic field, so as to prevent the heat insulator from being penetrated by the varying magnetic field to generate heat.

2. The aerosol generation device according to claim 1, wherein the magnetic field shield forms a magnetic field isolation region isolated from the varying magnetic field, and the heat insulator is arranged within the magnetic field isolation region so as to be isolated from the varying magnetic field.

3. The aerosol generation device according to claim 2, wherein the magnetic field isolation region is a roughly closed space enclosed and formed by the magnetic field shield.

4. The aerosol generation device according to claim 3, wherein the magnetic field shield comprises a first electromagnetic shielding film and a second electromagnetic shielding film that are arranged in turn from inside to outside along the radial direction of the chamber; and
   certain space is reserved between the first electromagnetic shielding film and the second electromagnetic shielding film, thereby forming the magnetic field isolation region.

5. The aerosol generation device according to claim 2, wherein the heat insulator presents a tubular shape extending along a length direction of the chamber, and a tubular hollow of the heat insulator forms an accommodation space configured to accommodate and hold the magnetic field generator and the susceptor; and
   the magnetic field shield at least comprises an electromagnetic shielding film extending along an axial direction of the heat insulator that encloses and forms the accommodation space.

6. The aerosol generation device according to claim 5, wherein the heat insulator comprises an inner tube wall and an outer tube wall that are arranged in turn from inside to outside along the radial direction, and the central region formed between the inner tube wall and the outer tube wall; and
   the electromagnetic shielding film is bonded onto an inner surface of the inner tube wall.

7. The aerosol generation device according to claim 5, wherein the electromagnetic shielding film has a thickness from 0.06 to 1.0 mm.

8. The aerosol generation device according to claim 3, wherein the heat insulator presents a tubular shape extending along a length direction of the chamber, and a tubular hollow of the heat insulator forms an accommodation space configured to accommodate and hold the magnetic field generator and the susceptor; and the magnetic field shield at least comprises an electromagnetic shielding film extending along an axial direction of the heat insulator that encloses and forms the accommodation space.

9. The aerosol generation device according to claim 8, wherein the heat insulator comprises an inner tube wall and an outer tube wall that are arranged in turn from inside to outside along the radial direction, and the central region formed between the inner tube wall and the outer tube wall; and the electromagnetic shielding film is bonded onto an inner surface of the inner tube wall.

10. The aerosol generation device according to claim 8, wherein the electromagnetic shielding film has a thickness from 0.06 to 1.0 mm.

11. The aerosol generation device according to claim 1, wherein the heat insulator presents a tubular shape extending along a length direction of the chamber, and a tubular hollow of the heat insulator forms an accommodation space configured to accommodate and hold the magnetic field generator and the susceptor; and the magnetic field shield at least comprises an electromagnetic shielding film extending along an axial direction of the heat insulator that encloses and forms the accommodation space.

12. The aerosol generation device according to claim 11, wherein the heat insulator comprises an inner tube wall and an outer tube wall that are arranged in turn from inside to outside along the radial direction, and the central region formed between the inner tube wall and the outer tube wall; and the electromagnetic shielding film is bonded onto an inner surface of the inner tube wall.

13. The aerosol generation device according to claim 11, wherein the electromagnetic shielding film has a thickness from 0.06 to 1.0 mm.

14. The aerosol generation device according to claim 13, wherein the electromagnetic shielding film is formed by one or more materials having a frequency of 20~300 kHz and a relative magnetic conductivity of 80~660.

15. The aerosol generation device according to claim 1, wherein the magnetic field shield further comprises a support body, and the electromagnetic shielding film is bonded onto the inner surface of the inner tube wall under the support or holding of the support body.

16. The aerosol generation device according to claim 15, wherein the support body presents a tubular shape extending along the axial direction of the heat insulator.

17. A heat insulation mechanism for an aerosol generation device, the aerosol generation device comprising a magnetic field generator configured to generate a varying magnetic field, and a susceptor configured to be penetrated by the varying magnetic field to generate heat, wherein the heat insulation mechanism comprises:

an accommodation space, which is configured to accommodate the magnetic field generator and the susceptor;

a heat insulator, which is configured to reduce conduction of heat from the susceptor towards a periphery along a radial direction of the accommodation space, the heat insulator comprising a tube wall, and a central region defined by the tube wall, wherein the tube wall contains a metal or an alloy; and a magnetic field shield, which is connected to the heat insulator and is configured to isolate the heat insulator from the varying magnetic field, so as to prevent the heat insulator from being penetrated by the varying magnetic field to generate heat.

18. The heat insulation mechanism for the aerosol generation device according to claim 17, wherein the heat insulator comprises an inner tube wall and an outer tube wall that are arranged in turn from inside to outside along the radial direction of the accommodation space, and the central region formed between the inner tube wall and the outer tube wall;

the magnetic field shield at least comprises a first electromagnetic shielding film bonded onto an inner surface of the inner tube wall;

or, the magnetic field shield at least comprises a first electromagnetic shielding film bonded onto an inner surface of the inner tube wall, and a second electromagnetic shielding film bonded onto an outer surface.

* * * * *